United States Patent [19]
Patel et al.

[11] Patent Number: 5,537,918
[45] Date of Patent: Jul. 23, 1996

[54] JUICE EXTRACTING DEVICE

[76] Inventors: Chandulal F. Patel; Neel C. Patel, both of 15 Brighton Pl., Laguna Niguel, Calif. 92677

[21] Appl. No.: 562,119

[22] Filed: Nov. 22, 1995

[51] Int. Cl.[6] .................. A23N 1/02; A47J 19/02
[52] U.S. Cl. .................. 99/510; 99/495; 241/92; 241/261.3; 241/273.2; 241/282.2; 366/314; 366/315
[58] Field of Search ................ 99/492, 495, 509–513; 100/37, 135; 241/37.5, 92, 199.12, 261.3, 273.2, 282.1, 282.2, 296, 260.1, 261, DIG. 17; 366/206, 289, 601, 314–317; 426/481, 489

[56] References Cited

U.S. PATENT DOCUMENTS

| | | | |
|---|---|---|---|
| 3,604,490 | 9/1971 | Bricker | 241/273.2 |
| 4,078,481 | 3/1978 | Wunderlin | 99/511 |
| 4,237,589 | 12/1980 | Boothe | 241/261.3 X |
| 4,518,621 | 5/1985 | Alexander | 99/513 X |
| 4,589,599 | 5/1986 | Williams | 241/282.2 X |
| 4,643,085 | 2/1987 | Bertocchi | 99/510 |
| 4,673,135 | 6/1987 | Cory | 241/92 X |
| 4,688,478 | 8/1987 | Williams | 241/282.1 X |
| 4,711,167 | 12/1987 | Sano | 99/510 |
| 4,852,814 | 8/1989 | Amiot et al. | 241/282.2 X |
| 5,035,174 | 7/1991 | Seal, Jr. | 100/52 |
| 5,222,430 | 6/1993 | Wang | 241/282.1 X |
| 5,289,763 | 3/1994 | Le Rouzk et al. | 99/503 |
| 5,356,083 | 10/1994 | Wettlaufer | 241/92 X |
| 5,381,730 | 1/1995 | Kim | 99/510 |
| 5,495,795 | 3/1996 | Harrison et al. | 99/492 |

*Primary Examiner*—Timothy F. Simone
*Attorney, Agent, or Firm*—Gene Scott

[57] ABSTRACT

A juicing device having a rotating disk with a plurality of protrusions is used to pierce and squeeze the juice from a fruit. The disk is rotated within an enclosure having an access port on top and a conduit near the bottom for diverting the juice into a container or glass. The enclosure provides a set of the protrusions as well so that as the fruit propelled between the disk and the sidewall, the juicing action is efficient.

5 Claims, 2 Drawing Sheets

JUICE EXTRACTING DEVICE

BACKGROUND OF THE INVENTION

1. Field of the Invention

This invention relates generally to juice extractors and more particularly to an improved extracting device that does not cut, or scrape the item being juiced, thus preserving the flavor of the juice and providing for an improvement in cleanliness and efficiency.

2. Description of Related Art

Invention and use of juice extracting devices is known. Wunderlin U.S. Pat. No. 4,078,481 discloses a strainer basket driven by a motor-powered vertically rotating shaft and a grating disc are mounted on a shaft including a plate with a pivot. The strainer basket is held radially at an equal distance from the plate and a counter force member presses the strainer basket against the plate to allow the basket to adjust to the force of an unbalance within it.

Le Rouzic et al. U.S. Pat. No. 5,289,763 discloses an apparatus for extracting juice having a base containing an electric motor, and a bowl removably attached to the base. The motor has a drive shaft which projects into the interior of the bowl for receiving process tools. The bowl is provided with a strainer which is equipped with a skin which fits inside the central tube surrounding the drive shaft. The driving shaft has a spindle fitted on it in two orientations, on in which the strainer remains static during operation and one in which the strainer is driven rotationally when the driving shaft is turning.

Seal, Jr. U.S. Pat. No. 5,035,174 discloses juice extracting device that provides a novel safety switch so that the device may only be operated when it is fully closed.

However, these devices, like many other such prior art juice extracting apparatus, operate by hitting, cutting or scraping the object across a grating device. This results in decreased flavor. It also frequently crushes the pits of the device, which then end up in the strained juice. These devices are incapable of extracting juice from hard, heavily pitted fruits like mangos, plums, cherries and other tropical fruits, as well as fruits with many seeds, such as pomegranates. Still further, these devices are incapable of extracting juice from fruits whose skin is too delicate to peel or scrape.

The present invention fulfills these needs and provides further related advantages as described in the following summary.

SUMMARY OF THE INVENTION

The present invention is an improved juicing device that extracts the maximum amount of juice without requiring cutting, scraping, pealing or grating, thus better preserving the taste, color and flavor of the juice.

The device consists generally of a juice reservoir with a spinning disk mounted above it and an upper housing secured above the reservoir and disk. The disk has a series of tiny straining holes, and the upfacing surface of the disk and infacing walls of the housing have a series of various sized blunt protrusions. A door is positioned in the housing so as to allow fruit to be placed in the device, on the disk. The motor causes the disk to spin at high velocity, which in turn causes the skin to be pierced or jolted and the item juiced due to repeated impact with the protrusions. Centripetal force of the circulating disk forces the bulk of the juiced object against the walls, while gravitational forces cause the extracted juice to fall through the straining holes and into the juice reservoir.

The protrusions continuously beat onto the items. They do not crush pits, grate, scrape or cut the skin but rather pierce the skin to the fiber, the impact of which causes liquid to be released from the item. The released material is immediately screened out and does not have any chance to be re-absorbed. The juice reservoir has an inner edge with an upwardly extending bearing on which the disk rests and rotates. The edges of the reservoir are sealed so that juice will not escape. The disk is connected at its center to a shaft which receives driving force from a motor.

Preferably, the jar is angled inwardly so that material thrown toward the periphery is thrown back toward the center repeatedly. The bottom opening of the jar is latched securely onto the reservoir. A continuos feeder can be placed on the side or top of the jar for continuous operation.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a device for extracting juice from a fruit. In such drawings.

DETAILED DESCRIPTION OF THE PREFERRED EMBODIMENT

Figure 1:
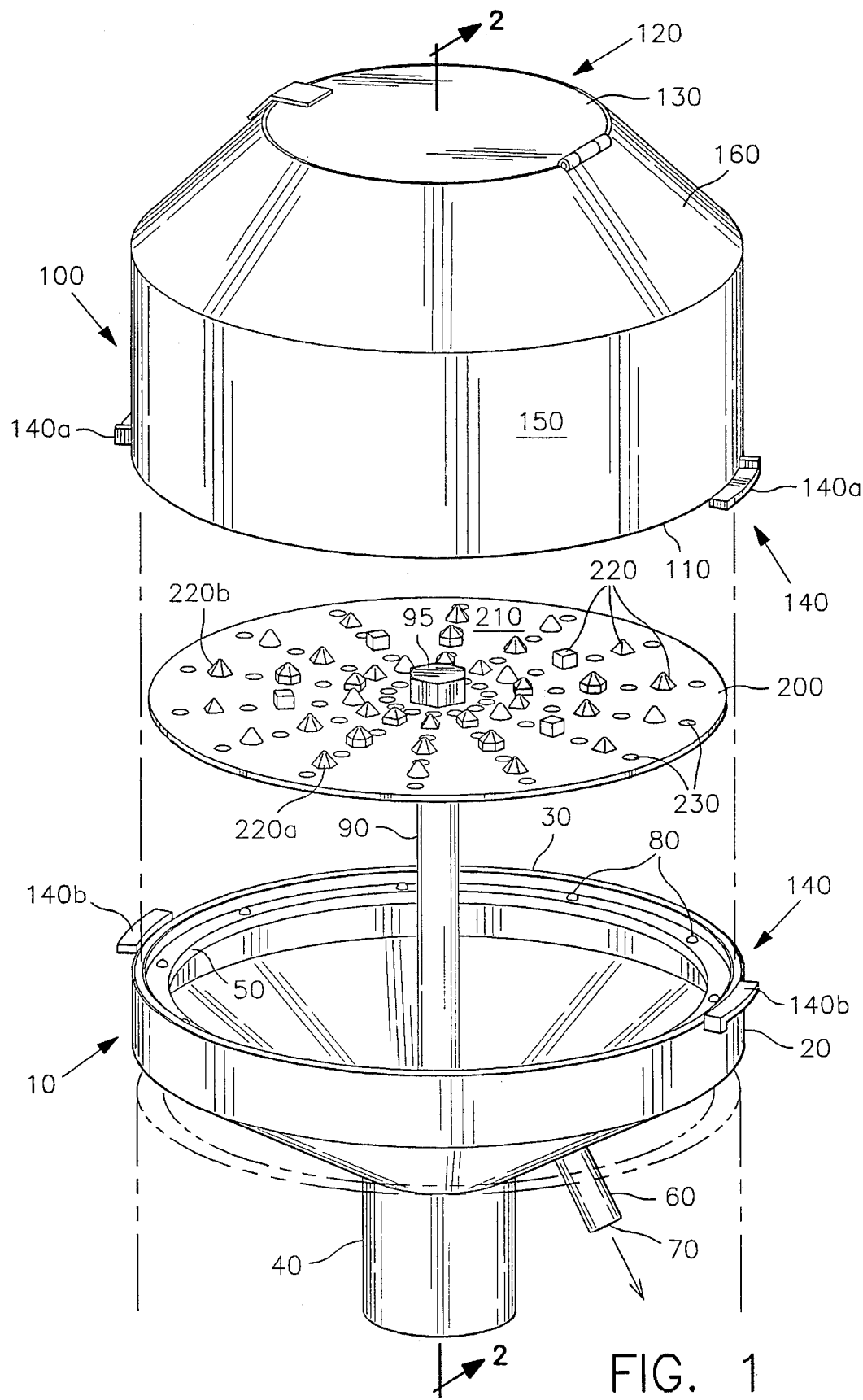
FIG. 1 is an exploded perspective view of the preferred embodiment of the present invention.
Figure 2:
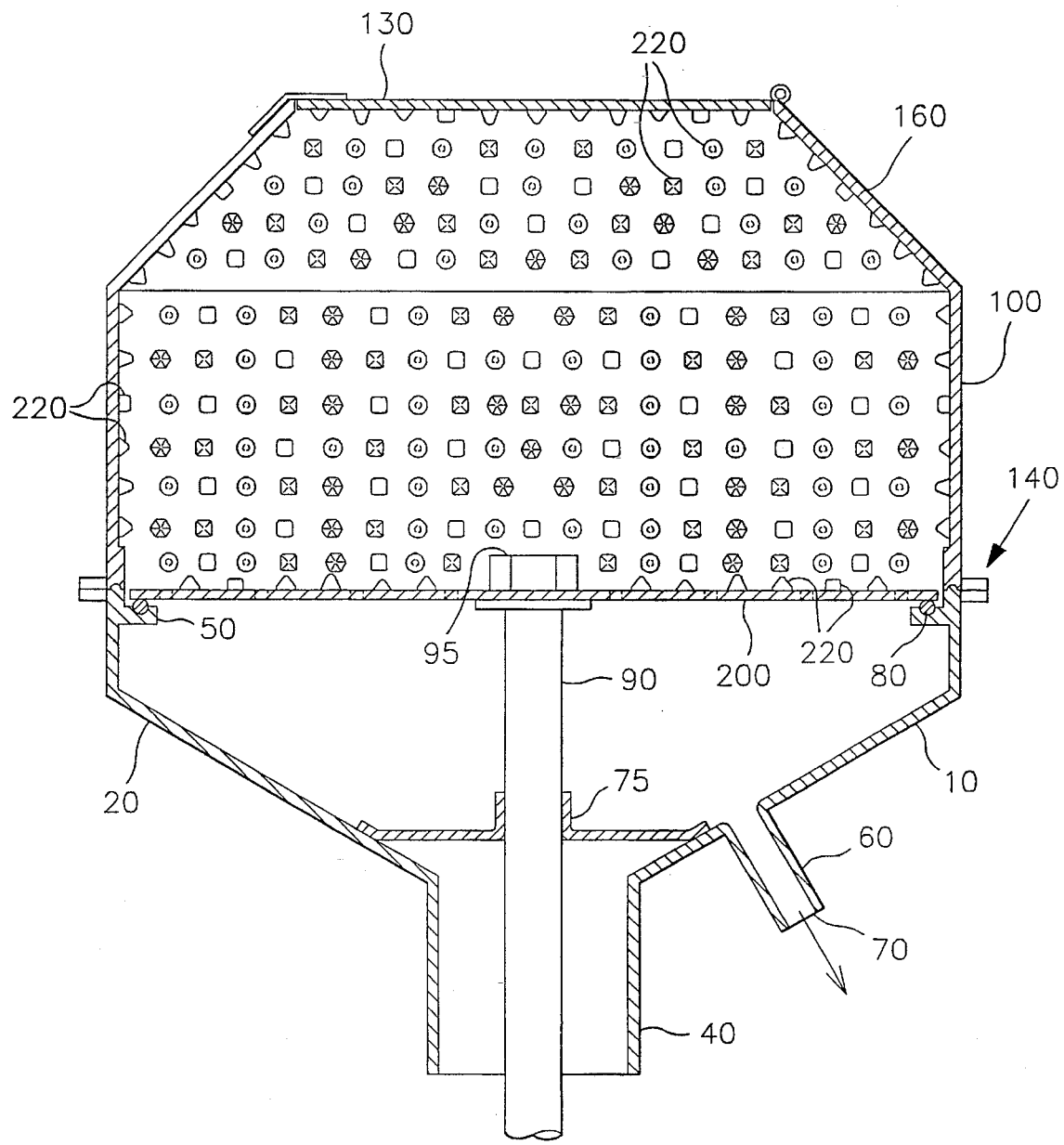
FIG. 2 is a cross-sectional elevational view thereof taken along line 2—2 in FIG. 1.

The above described drawing figures illustrate a device for extracting juice from a fruit (not shown). The juice extracting device includes a funnel shaped base unit 10 with a sidewall 20 terminating in an upwardly facing first sealing rim 30 and converging downwardly into a neck portion 40 interconnected with a motive means (not shown) such as an electric motor. The base unit 10 further has an annular bearing flange 50 extending inwardly from the sidewall 20 below the first sealing rim 30. A top unit 100 is configured for mounting on the base unit 10, the top unit having a generally cylindrical shape terminating in a downwardly facing second sealing rim 110. The first and second sealing rims 30, 110 mate for sealing the base and top units to form a closed container. The top unit 100 provides an access aperture 120 and a hinged access aperture door 130, the door 130 being positionable for closing the access aperture 120 and alternately for uncovering the access aperture. The top unit 100 and the base unit 10 provide a means for rotational mutual locking engagement 140 for locking the units 10, 100 integrally together. This locking means 140 includes two pairs of outwardly extending ears 140*a* and 140*b*, one pair on the base unit 10, the other on the top unit 110, the ears 140*a*, 140*b* being configured so that the ear sets 140 are mutually engageable.

A horizontally oriented extractor disk 200 is supported on the bearing flange 50 and rotates on it. The disk 200 is interconnected with the motive means so that the disk may be rotated at high velocity. The disk further provides an upwardly facing top surface 210, the top surface having a plurality of upwardly extending protrusions 220, the protrusions providing blunt edges 220a and blunt points 220b for juicing a fruit placed onto the extractor disk 200. The disk further provides a plurality of holes 230 for conducting liquids (not shown) from the surface 210 downwardly into the base unit 10. The base unit further provides a conduit 60 for conducting liquids from the extractor disk 200 to an outlet aperture 70 at the terminus of the conduit 60 from which the liquids are collectable.

Because the extractor disk 200 rotates at high rotational speeds, the device preferably includes a plurality of ball bearings 80 engaged on the bearing flange 50, the extractor disk 200 resting on the ball bearings 80. A connector rod 90 joins the motive means and the extractor disk 200, the disk held thereon by a fastener 95, such as a screw. Preferably, the top unit sidewall 150 provides a plurality of the protrusions 220 such as on the extractor disk 200, so that upon striking the inside surface of the top unit sidewall 150, the fruit is further juiced. Preferably the top unit sidewall 150 also includes a portion 160 configured as a frustrum of a cone so as to return fruit thrown outwardly by the rotation of the extractor disk 200, back toward the center of the extractor disk 200.

In operation, fruit is placed through the top aperture 120 onto the extractor disk 200, and the disk is then rotated at a high rotational velocity. The blunt protrusions 220 on both the disk 200 and the side wall 150 of the top unit puncture the fruit and the impact causes the juices trapped within the fiber of the fruit to be squeezed out of the punctures. The fruit is not peeled, cut into small pieces or mashed by the device. Instead it is simply punctured and then squeezed by impact action against the sidewalls and the disk to force the juice from the fruit. The juice forced from the fruit falls through the holes 230 in the disk 200 and into the base unit 10 from which it is diverted through the conduit 60. In this manner, the fruit is left as a relatively whole, but dried and flattened mass to be removed through the top aperture. Very little, if any, residue is produced or left behind, so that the operation is clean and the device requires little, if any, cleaning between operations.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A juice extracting device comprising:

a base unit having a funnel shaped base unit sidewall terminating in an upwardly facing first sealing rim and converging downwardly into a neck portion interconnected with a motive means, the base unit further having an annular bearing flange extending inwardly from the sidewall below the first sealing rim;

a top unit for mounting on the base unit, the top unit having a generally cylindrical shape terminating in a downwardly facing second sealing rim, the first and second said sealing rims mating for sealing the base and top said units to form a closed container, the top unit providing an access aperture and a hinged access aperture door, the door positionable for closing the access aperture and alternately for uncovering the access aperture;

a horizontally oriented extractor disk supported on the bearing flange and rotatable thereon, the disk being interconnected with the motive means so as to rotate the disk, the disk further providing an upwardly facing top surface, the top surface having a plurality of upwardly extending protrusions, the protrusion providing blunt edges and blunt points for juicing a fruit placed onto the extractor disk, the disk further providing a plurality of holes therein for conducting liquids from the surface downwardly into the base unit;

the base unit further providing a conduit for conducting liquids from the extractor disk to an outlet aperture.

2. The device of claim 1 wherein the annular bearing flange includes a plurality of ball bearings engaged therein, the extractor disk resting on the ball bearings.

3. The device of claim 1 wherein the motive means is interconnected with the extractor disk by a connector rod, the disk held thereon by a fastener.

4. The device of claim 1 wherein the top unit includes a top unit sidewall, the sidewall providing a plurality of the protrusions of the extractor disk, so that upon striking the top unit sidewall, the fruit is further juiced.

5. The device of claim 4 wherein the top unit sidewall includes a portion configured as a frustrum of a cone so as to return fruit thrown outwardly by the extractor disk, back toward the center of the extractor disk.

* * * * *